United States Patent Office 2,733,469
Patented Feb. 7, 1956

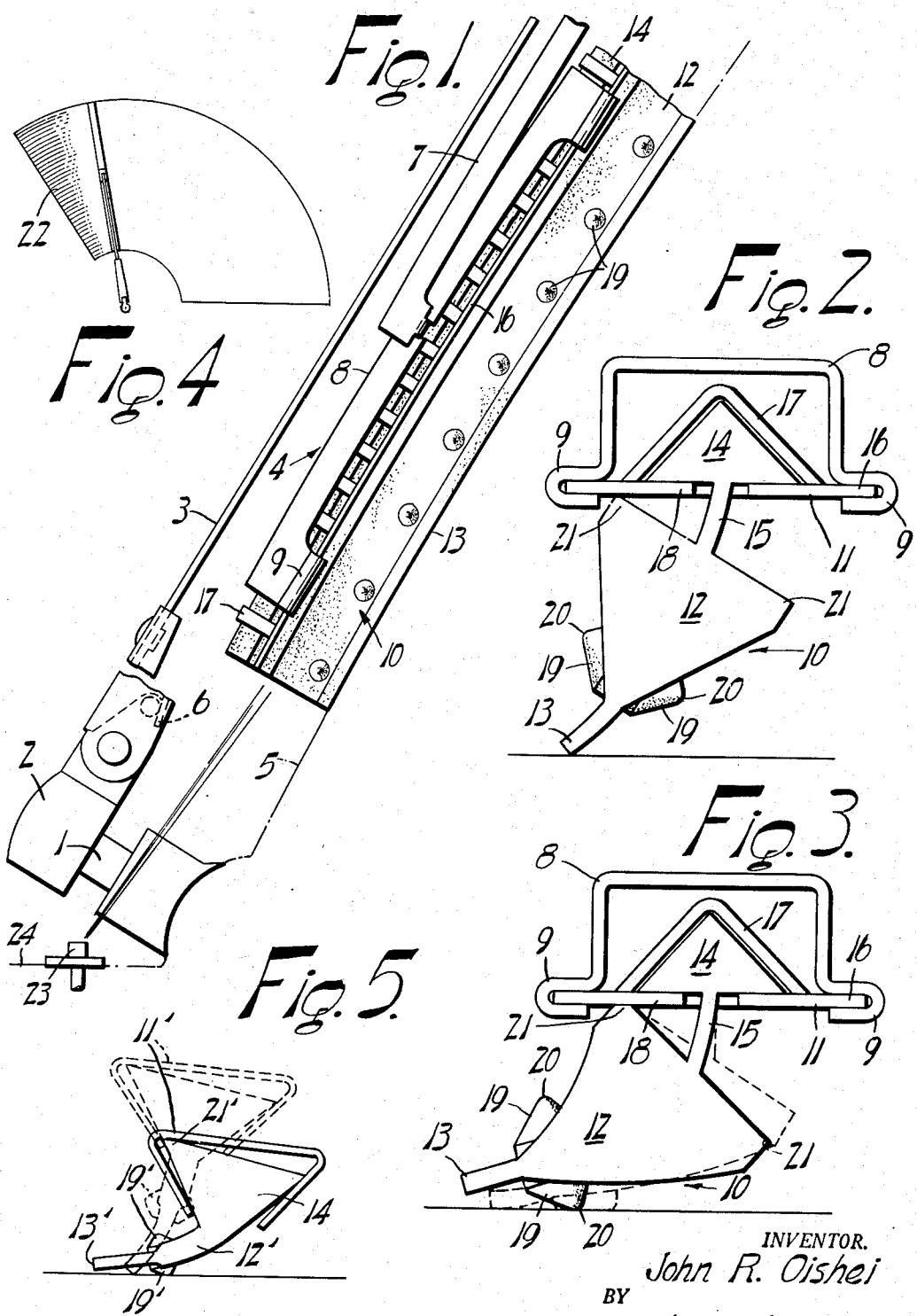

2,733,469

WINDSHIELD WIPER BLADE

John R. Oishei, Buffalo, N. Y., assignor to Trico Products Corporation, Buffalo, N. Y.

Application April 21, 1951, Serial No. 222,228

4 Claims. (Cl. 15—245)

This invention relates to the art of wiping the windshields and windows of motor vehicles and powered craft in general, such as automobiles, aeroplanes, locomotives, and seagoing craft, to maintain a clear vision therethrough.

With the advent of the curved and slanting windshields and the increase in vehicular travel, the higher concentration of traffic at stoplight thoroughfares, in parking zones, and in other congested areas, it has been discovered that a vision obscuring film is deposited upon the forwardly sloping windshield as a result of the engine gases which rise from the exhaust manifold. These oil-laden exhaust fumes, which are made up largely of moisture condensed out of the mixture of air, vaporized gasoline, and the residue of oil that enters the firing chamber, are concentrated in these congested areas and deposit upon the windshield either directly from the air or indirectly from the wheel-spray, as when the roadways are wet after rains or during periods of melting snow. This film on the glass is ordinarily not discernible while dry but it fogs the field of vision when wet and prevents a thorough wetting of the glass. The result show up in the form of microscopic droplets which gather when the wiping blade passes over the surface of the shield at the next wetting. These droplets either evaporate or form a screen during wiper operation for as long as the shield is fouled with the film and until the rubbing of the wiper breaks the surface tension. The time required to cut through the film depends upon the extent of the deposit.

Tests have shown that vision-destroying film can be lifted or removed from a shield quickly by means of the cling-cleaning or friction action of a soft surface rubber blade. The wiping lip or edge of the blade, to be quickly effective, must cling to the film coated surface to peel the film from the glass and expose the latter to the moisture before it can be spread uniformly thereover free of vision-blurring bubbles, and the like. Rubber of the quality required should possess an extremely high coefficient of friction to develop the desired film-lifting cling, after the manner of a suction-like hold of the elastic material upon the surface, that tenaciously grips the film-coated glass surface. While the cling characteristic in the wiping lip is much desired because of its effectiveness in lifting or peeling off the objectionable film from a fully wet surface, nevertheless it has its disadvantages in that on a dry or partially dry surface the lip will cling abnormally so much so that the lip will stretch excessively and fray at the edge to impair its wiping efficiency. Further, this undesired lip-cling is amplified by the spring pressure of the wiper carrying arm, imposing an additional load on the wiper motor to the extent of requiring a power output three or four times that normally required. Sometimes, the motor will be stalled by the tenacious lip-grip. In certain installations cable transmissions that develop slack are employed to carry the power up to the wiper, the cable being supported and guided by pulleys. In times of excessive cling, the transmission yields and causes a shortening of the wiper stroke and a consequential reduction in the field of vision.

Furthermore, in compounding the rubber, a filler is used in limited quantities to retard the effect of ozone deterioration and the cracking of the rubber surface. Stretching of the blade lip portion unduly pulls the filler to the surface and minute particles of rubber and the filler adhere to the glass surface and form another type of vision-obscuring "curtain" which is very difficult to remove.

More recently motor cars have been equipped at the factory with an auxiliary water squirting device to wash and aid in cleaning the shield while driving. The water is delivered in a stream onto the glass and partially dispersed thereover by the air currents. The wetting of the glass is frequently spotty and mingled with dry areas. The blade must be depended upon to complete the water distribution but may fail to wet the entire surface traversed by the wiper. Consequently, a wet-dry condition results which subjects the wiping lip, or portions thereof, to an erratic action—jerking and pulling more or less across the glass—in accordance with the extent of the water-lubricated area. The use of solvents, including detergents, in the water supply of such squirting devices, tends to set up a somewhat sticky surface for the clinging lip.

In all of these dry or partially dry conditions, the wiping lip is intermittently subjected to severe strains that tear at its anchorage. The result is an irregular and inefficient performance that wears on the wiping lip and imposes an unnecessary burden on the cleaner mechanism.

In an earlier Patent No. 2,543,383 there is disclosed a clinging wiping edge, with means acting to preclude the cling factor from exceeding a predetermined maximum. Consequently, the wiping lip remains in clinging contact with the glass surface at all times, with the attendant hazards of such use.

The primary object of this invention is to provide an improved wiper of the cling-cleaning character in which the clinging wiping edge, as well as the cleaner mechanism, are protected from the aforesaid misuse and abuse by causing either a cessation or a modification of the cleaning function of the wiper as it moves over a dry or partially dry area.

The principal purpose of this invention is to provide a wiper which will regulate the cling of its wiping lip automatically in accordance with the condition of the windshield surface, thereby enabling the use of a rubber having a high coefficient of friction for quickly and effectively removing the vision-obscuring film from a wet, well-lubricated surface but employing this same clinging force to dispose and render the wiping lip more or less wholly ineffective when—and only when—abnormal cling is encountered either on a partially wet or on a dry surface.

This is accomplished by providing the wiper with a lip-lifting, non-cleaning skid surface which normally is inoperative but which becomes operative during periods of excessive lip-cling to modify and even remove the arm pressure from the wiping lip. This skid surface is in the form of a longitudinal series of raised skids that constitute fulcrum points on which the wiping lip may be levered more or less from wiping contact with the glass surface. These skids are herein illustrated as posts or knobs which are raised and project beyond the body line of the wiper to take the entire pressure load of the wiper arm, or a part thereof, and thereby release the wiping lip for being skidded freely across the imperfectly wet areas without substantial lateral resistance to the motive power.

The need for breaking the lateral resistance to wiper movement on a semi-wet or dry glass surface is readily apparent on curved windshields. Much progress has been made in the art of glass bending and sharper curvatures have been commercially produced and already adopted by car builders. Longer wiping blades have been required. As a consequence, the flexibly backed, curved glass wiping blade is called upon to flex to a greater degree for contacting the glass of sharper radii, with the result that at the time of the reversal of blade movement, particularly in the outboard area of greater curvature, the lip is caused to roll under along its longitudinal axis in transferring the pressure from one side of the blade to the other. In the execution of this movement on a semi-wet or dry glass, the clinging resistance reaches its highest point. A heavier grab of the wiping lip develops through the more intimate grip of the lip on the surface curvature and by reason of the travel of the wiper up the curved surface against increasing arm pressure. According to the present invention, this excessive cling is relieved by shifting the weight of the arm spring over onto the knobs which have a minimum contact area with the glass, thereby removing the abnormal load from the source of power and the power transmission and freeing the lip and its supporting neck from further strain.

Further advantages flowing from this invention are found in the preservation of the wiper and in the protection of the windshield surface. The body portion of the improved wiper is preferably much heavier than the wiping lip, and less flexible, to afford the skid surface of reduced contact area a more substantial support for insuring the lip-lifting action. The body portion is suspended by a flexible neck that is subject to stretching. When the lip abnormally clings, the skids come into play to prevent the neck from becoming unduly stretched and untimely broken, since without the skids a severe stretching of the neck will expose the rubber to the ravages of ozone, causing it to harden and crack, and result in an early breaking of the neck to leave the flexible metal blade-carrying backing or frame unsupported for rolling over into contact with the glass and scratching its surface, a hazard which is magnified by the use of a softer surface glass, characteristic of the glass used in the shaping of curved windshields, and further magnified by the extraordinary torque exerted under cling conditions and a resultant twisting and loosening force on the arm and blade-carrying superstructure.

The foregoing and other objects will manifest themselves as this description progresses, reference being made therein to the accompanying drawing, wherein Fig. 1 is a side elevation of the improved wiper as applied to a windshield;

Figs. 2 and 3 are end views of the wiper in different positions of action;

Fig. 4 is a front elevation of a windshield and indicating by the broken arcuate lines the paths of the contacting skids thereon; and, Fig. 5 is an end elevation of a modified wiper.

Referring more particularly to the drawing, the numeral 1 designates an oscillatory shaft on which is fixed a wiper actuating arm 2 for being oscillated thereby. The arm has a hinged outer section 3 carrying at its outer end a flexible wiper 4. The pressure in the wiping contact upon the windshield surface 5 is provided by a spring 6 at the hinge joint, in a well known manner, the spring pressure being transmitted to the wiper and distributed throughout its length by a flexible holding frame comprising a primary yoke 7 and secondary yokes 8, the latter having sets of opposing seats 9 receiving the wiper. The wiper 4 comprises a rubber blade on squeegee 10 and a flexible surface-conforming backing 11, the latter engaging in the seats 9. The blade may be molded to provide a body portion 12 with a relatively thin wiping lip 13 along one longitudinal margin and an anchoring head or bead 14 along the opposite margin and hingedly connected to the body portion by a reduced neck 15 that enables the body and its wiping edge to swing as a unit from the anchorage 14 laterally of the backing for assuming the proper wiping position. The flexible backing 11 has parallel frame members 16 joined by arched cross straps 17 to form a channel-like seat in which the anchoring head may rock or float, being loosely confined therein by the inwardly projecting fingers 18.

The rubber (which term as used herein comprehends a rubber substitute) from which the squeegee, or its wiping lip, is molded should have a predetermined coefficient of friction and be of a character best suited for the purpose of lifting or peeling off the undesired foreign matter from a fully wet surface. The molded blade carries, at a distance above the line of wiping contact between the lip and the glass, a longitudinal series of spaced skids 19 resembling posts or knobs that project laterally beyond the body lines or planes of the opposite sides of the body portion to provide an emergency broken line of support for the arm pressure load in contrast to the continuous surface of the wiping lip. These skids are disposed to be normally ineffective but are sufficiently close to the normal line of wiping engagement as to be brought down into contact with the glass upon an abnormal clinging pull on the lip assisted by the two force components in the actuating arm. The skid engagement initially arrests expansion of the clinging area of contact of the lip upon the glass and then begins to modify the present cling by a levering action which lifts upon the lip and to lessen its tenacious hold upon an insufficiently wet surface. This frees the wiper to continue its powered stroke upon the much reduced area of supporting contact as provided by the skids. The skid engagement may be made through contact points 20 which aggregate a contacted area much less than that of the displaceable clinging side face of the lip but is nevertheless capable of sustaining the entire arm load after lifting the lip from the glass. The skids may have spherical or conical tops to form the contact points 20 as well as lines of contact crosswise of the blade, as indicated by the dotted lines in Fig. 3, for taking part of the arm load when the lip has light contact with the glass. This transverse lineal contact forms a runner-like sliding engagement which also offers a minimum lateral resistance.

This is accomplished through contact points of equal transverse and longitudinal section to provide a predetermined and unchanging area of body surface contact with the glass unmodified by the blade rotation on its longitudinal axis, thus avoiding the transfer or addition of cling from one blade section to another section having equal or greater cling creating area.

In action, the wiping lip normally will have edge contact with the fully wet glass, as depicted in Fig. 2, the lip clinging to the desired though limited extent for effecting a clean wipe. On a partially wet surface the lip will cling to a greater extent, retarding the wiper and even stopping the same. When this abnormal cling develops, the skids will be pulled down upon the glass, as shown in Fig. 3. This not only prevents additional surface contact by the lip, but it also permits a rocking motion to take place, the body pivoting on the knobs to lift the clinging lip with a modifying influence toward breaking its hold. The motion-retarding resistance to the wiper movement having been removed, the wiper will be skidded across the surface under the motive power to complete its stroke. On other partially dry surfaces, the body portion 12 will roll under even to a greater extent to bring the round dome tops 20 of the knobs into supporting contact with the glass, as illustrated by the solid lines in Fig. 3, further lifting the wiping lip off the glass.

The lip-lifting action is facilitated by the two force components transmitted by the arm, one being that of the spring pressure which is applied normal to the underlying surface, and the other being the motivating force for moving the wiper against the resistance offered by the clinging lip. The cling resistance to wiper movement reacts in a lip-imposed pull upon the body portion 12 which, coupled with the downward urge of the spring force, brings the skids down upon the glass and interposes them beneath the laterally flexed body portion 12 to serve as a sustaining support for the lifted wiping lip against the spring urge. The lip is levered from the glass on the skid means as a point of fulcrum, the spring force acting down upon the body portion as a power arm to lift the wiping lip in breaking the adhesion. To insure this levering action, the body portion is made less flexible by giving it a triangular shape in cross section so that its sides will converge downwardly toward the wiping lip, reducing the width gradually from a wide back portion. The wide back portion, to which the neck 15 joins medially, is nearly coextensive in width with the flexible backing 11 and has its opposite margins constituting thrust-taking shoulders 21 alternately engageable with the underface of the flexible backing as the suspended body portion swings laterally. It is through the thrust shoulders 21 that the spring force is applied to the heavier body portion against a slight tensioning of the neck. The tapered outer part of the body portion is increasingly more flexible as it approaches the wiping lip, but less flexible than the latter, to permit not only a lateral flexing of the attenuated portion but also a bending to the varying degrees necessary to conform the lip carrying part to the surface contour of the glass. It is to be noted that by this arrangement the fulcrum points, in effect, shift to the left as the lip lifts, Fig. 3, varying the leverage by increasing the effective length of the power arm to which the spring pressure is applied through the shoulder contact 21. The body portion 12, being heavier and less flexible than the wiping lip, provides a more substantial support for the skids and for this levering action under the spring arm load. It further provides a solid body through which the spring force is transmitted from shoulder 21 while leaving wiping lip free to flex independently of the skids. Furthermore, the skids are preferably arranged in opposition to each other for an effective increase in the thickness of the body at these spaced points throughout the length of the wiper, although, if desired, the skids of one series may be staggered relative to those of the other series.

As stated above, the skids are normally inactive and, being relatively small, their presense adds practically no burden to the small windshield motor during a normal cleaning operation. Upon encountering a dry surface on the shield or window, the skids arrest the cleaning operation and carry the wiping lip idly over the dry surface to relieve the wiper motor from an overloaded condition and even lessening the load below normal because of the reduced skid area which has replaced the larger clinging lip. The skids, when taking the full load of the actuating arm, afford sustaining support for the wiping lip at longitudinally spaced intervals, permitting it to drape in between.

The spacing of the skids lengthwise of the wiper may vary. Successful results are obtainable by having them approximately one-quarter of an inch apart and about one-sixteenth of an inch in diameter. They may assume different shapes. Their presence tends to level off the motor-imposed load of the wiper and thereby maintains the mechanism operating at a substantially uniform speed. Should the glass surface have a dry spot less than the full length of the wiper, the immediately adjacent skids passing thereover will alone function to lift only that portion of the lip while the remaining lip portion holds its wiping contact to clean the glass. The lip and the skids work jointly when the glass is only dry or partially wet since the lip brings the skids into the load carrying position followed by the rocking action which lifts the lip from wiping contact.

At times, it is possible to discern the arcuate paths of the skids on a dry or partly dry surface, as indicated at 22 in Fig. 4, which paths are quickly removed as soon as the wiping lip again functions on a moist surface. Many vehicles are now equipped with automatic washers to enable the windshields being washed while traveling. A small nozzle 23 is arranged on the cowl 24 to properly direct the solution into the path of the wiper. The wiper is relied upon to assist in spreading the solution uniformly over the path on the windshield. With the improved wiper, the cleaning operation will follow promptly on such areas which are wet, the wiper acting through a normal stroking to spread the patches of solution still further.

The modification shown in Fig. 5 shows a wiper for a flat windshield surface, wherein the skids 19' are used to advantage on the flexible body portion 12' to lift the more flexible wiping lip 13' when abnormal clinging occurs under poorly wet conditions. In this embodiment the blade has an anchoring enlargement 14' which floats within the channel of the holder or backing 11' for self-adjustment upon the windshield surface. The broad back face of this blade rocks laterally upon the bottom wall of the channel, on first one and then the other of the two shoulders 21' for taking the spring load and transmitting it through the body portion 12' down to the skids.

In both forms of the invention the control of the degree of lip cling may be effected by the height of the skids. Without the skids, the flat longitudinal side face of the lip would curl under to exert an excessive clinging action which at times will hold the blade immovable against the full turning torque of the motor and even pull the anchoring bead out of its backing recess. By means of the automatic shift of the arm pressure from the wiping lip to the skids, the condition is corrected. The wiping blade is efficient in that it expeditiously removes vision-obscuring deposit. The wiping lip is preserved from premature wear and tear by removing it from a destructive clinging engagement, thereby prolonging its life.

The heavier body portion and its carried wiping lip constitute an outer section of the blade body which is displaceable rearwardly to an abnormal position, in which position the outer section rides on the skids as it is being pulled or towed by the inner anchoring bead under the urge of the actuating arm. In this riding position the angularly displaced outer section is free of any lip-cling for idly riding on the skids.

While the foregoing description has been given in detail, it is without thought of limitation since the inventive principles involved are capable of assuming other physical embodiments without departing from the spirit of the invention and the scope of the appended claims.

What is claimed is:

1. In a windshield wiper assembly, a squeegee unit including a wiping portion and a relatively heavier supporting body portion, the wiping portion being flexible and including a bottom edge and sidewalls, said sidewalls joining with the sidewalls of the relatively heavy body portion, friction members in the form of longitudinally arranged spaced knobs carried on each side of the body portion adjacent the junction of the wiping portion and said body portion, said spaced knobs extending laterally beyond the sidewalls of said wiping portion and being normally out of contact with the surface to be wiped, means supporting the said body portion to permit a partial rotation of said body portion on a longitudinal axis due to excessive drag caused by engagement of increased areas of the sidewalls of the wiping portion with the surface to be wiped, said knobs upon such rotational movement of the body on said longitudinal axis moving into contact with the surface to be wiped and forming on said surface fulcrums on which the body portion may rock for lifting said dragging wiping portion.

2. In a windshield wiper assembly, a squeegee unit including a wiping portion and a relatively heavier supporting body portion, the wiping portion being flexible and including a bottom edge and sidewalls, said sidewalls joining with the sidewalls of the relatively heavy body portion, friction members in the form of longitudinally arranged spaced knobs carried on one side of the body portion adjacent the junction of the wiping portion and said body portion, said spaced knobs extending laterally beyond the sidewall of said wiping portion and being normally out of contact with the surface to be wiped, means supporting the said body portion to permit a partial rotation of said body portion on a longitudinal axis due to excessive drag caused by engagement of increased areas of the sidewalls of the wiping portion with the surface to be wiped, said knobs upon such rotational movement of the body on said longitudinal axis moving into contact with the surface to be wiped and forming on said surface fulcrums on which the body portion may rock for lifting said dragging wiping portion.

3. In a windshield wiper assembly, a squeegee unit including a flexible wiping portion and a relatively heavier supporting body portion, the wiping portion extending downwardly from and below the body portion and including a bottom edge and parallel sidewalls, said sidewalls joining with the sidewalls of the relatively heavy body portion and forming therewith an obtuse angle, frictional members in the form of longitudinally arranged spaced knobs carried on each side of the body portion adjacent the junction of the wiping portion and said body portion, said spaced knobs extending laterally beyond the sidewalls of said wiping portion and being normally out of contact with the surface to be wiped, means supporting the said body portion to permit a partial rotation of said body portion on a longitudinal axis due to excessive drag caused by engagement of increased areas of the sidewalls of the wiping portion with the surface to be wiped, said knobs upon such rotational movement of the body on said longitudinal axis moving into contact with the surface to be wiped and forming on said surface fulcrums on which the body portion may rock for lifting said dragging wiping portion.

4. In a wiper blade for cleaning film deposits and moisture from a windshield surface including a blade of rubbery material having a capacity to cling to a dry surface, and a channeled holder loosely carrying the same, said blade embodying a wide back portion laterally rockable within the channel of the holder, said blade body having a flexible body portion of uniform thickness projecting beyond the holder and a relatively thin lip attached to the projecting body portion to provide a clinging wiping contact with the glass surface of the shield while moving laterally thereon, said lip forming a continuous edge portion for unbroken contact with the glass surface, and a row of cling-reducing knobs formed on the side of the body portion adjacent the marginal edge of the lip to engage the surface in supporting contact upon partial rotational movement of the blade in said channeled holder due to excessive clinging action of the lip on the glass surface, said knobs upon such rotational movement of the body on said longitudinal axis moving into contact with the glass surface being wiped and forming on said surface fulcrums on which the blade may rock for lifting said dragging wiping portion.

References Cited in the file of this patent

UNITED STATES PATENTS

| | | |
|---|---|---|
| 2,179,451 | Horton | Nov. 7, 1939 |
| 2,306,946 | Horton et al. | Dec. 29, 1942 |
| 2,343,843 | Horton et al. | Mar. 7, 1944 |

FOREIGN PATENTS

| | | |
|---|---|---|
| 854,122 | France | Jan. 4, 1940 |